June 26, 1945.　　H. MOSCHEL ET AL　　2,379,371
HARVESTING AND PACKAGING MACHINE
Filed Nov. 20, 1940　　7 Sheets-Sheet 1

INVENTOR:
HERMAN MOSCHEL
GEORGE B. HILL
BY
ATTORNEYS.

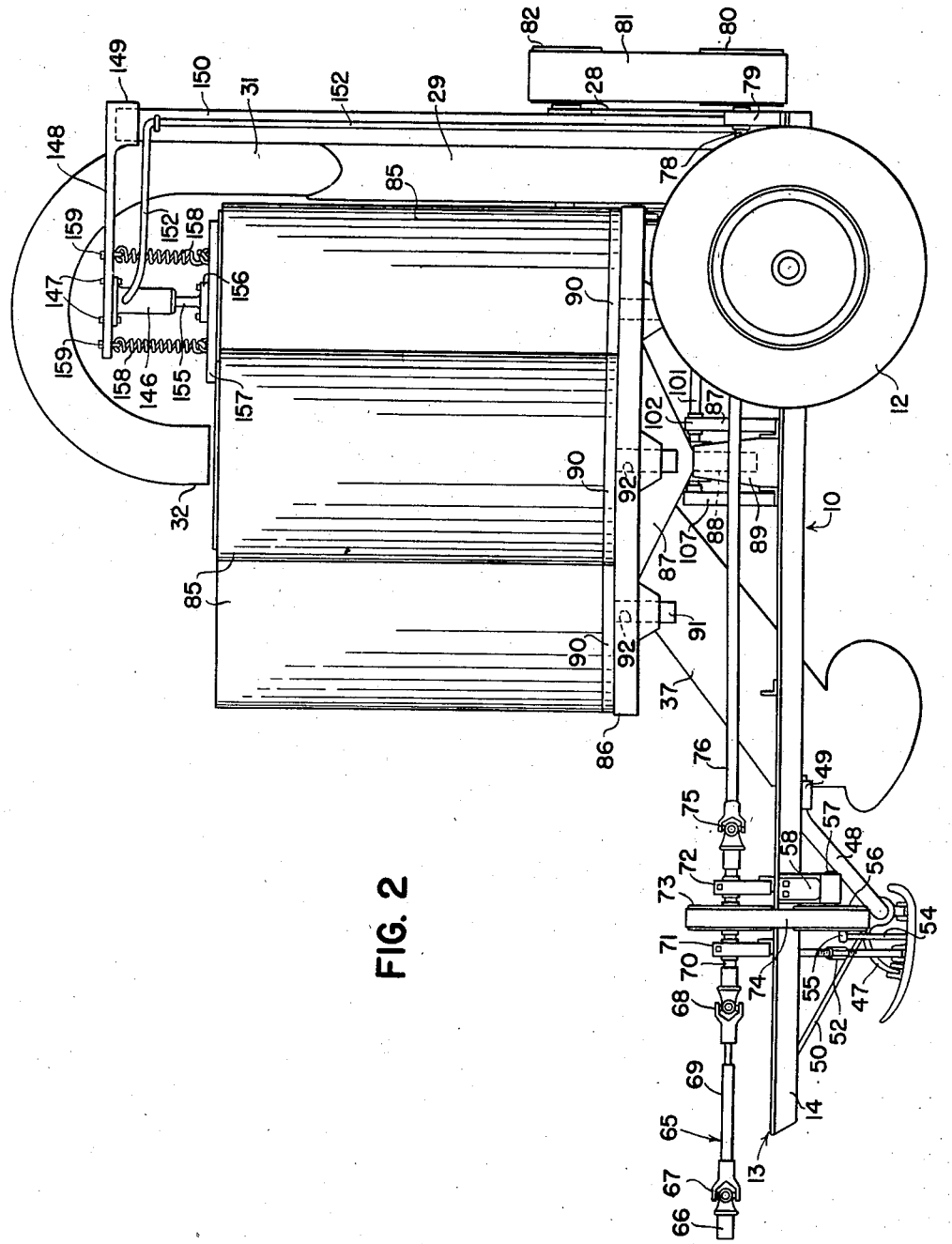

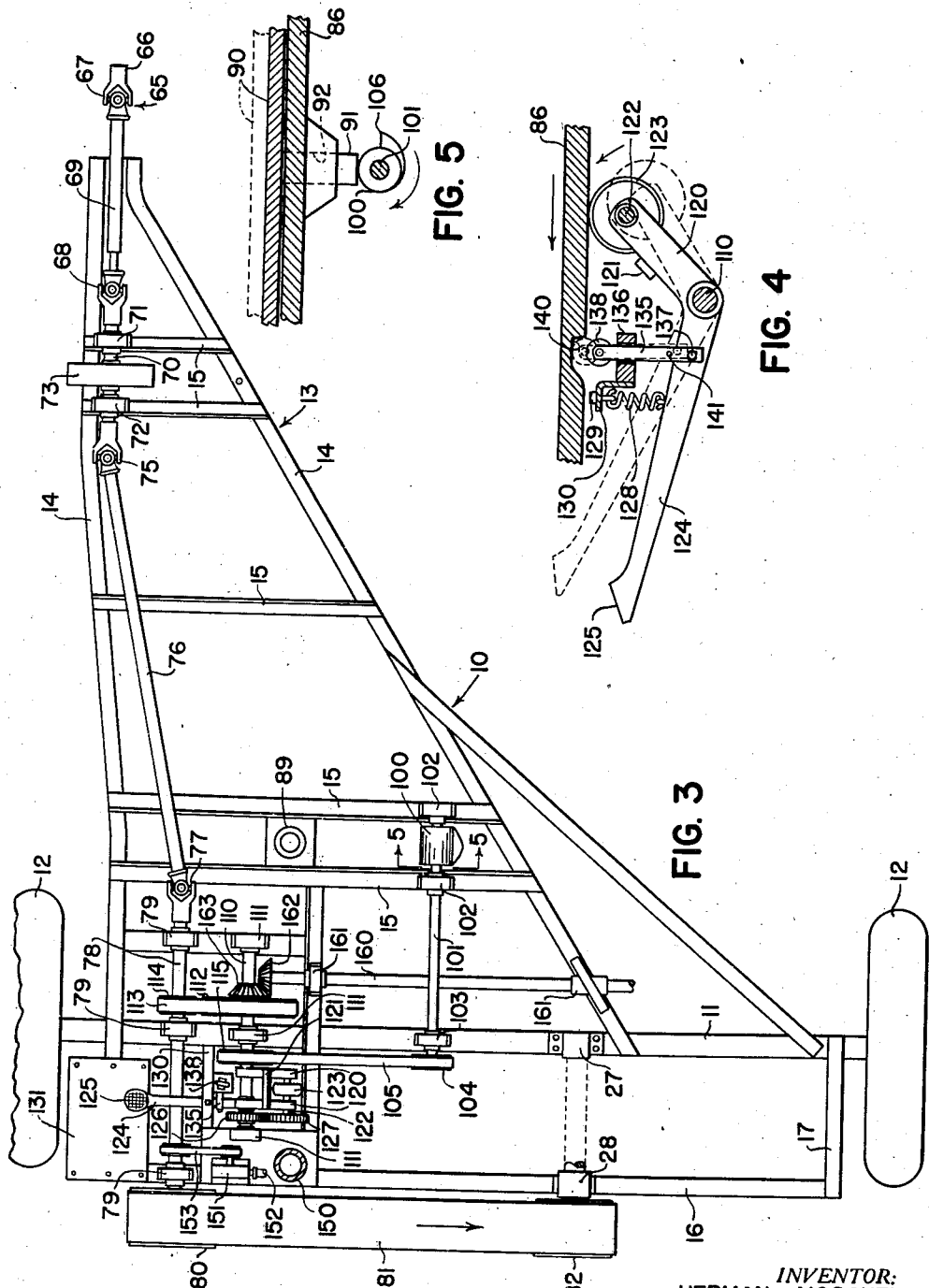

June 26, 1945.  H. MOSCHEL ET AL  2,379,371
HARVESTING AND PACKAGING MACHINE
Filed Nov. 20, 1940  7 Sheets-Sheet 5

INVENTOR:
HERMAN MOSCHEL
GEORGE B. HILL
BY
ATTORNEYS.

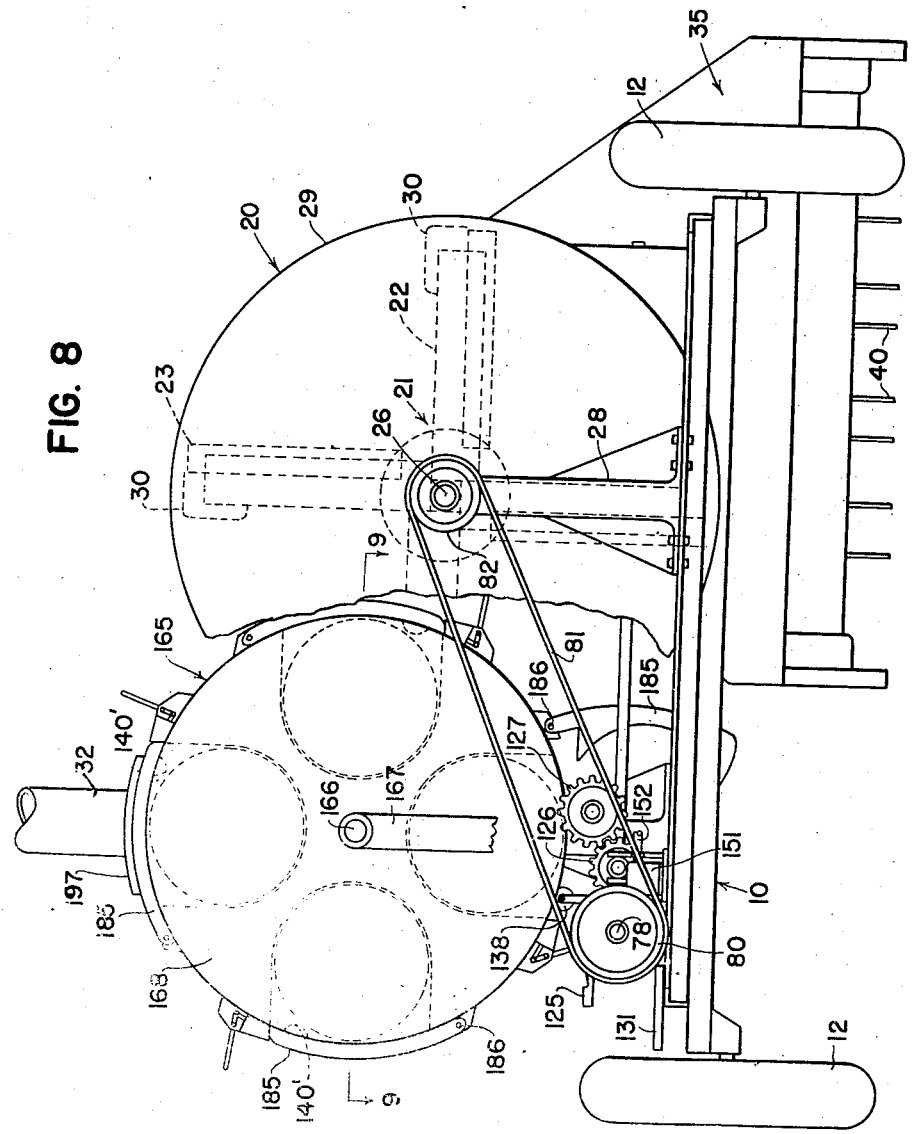

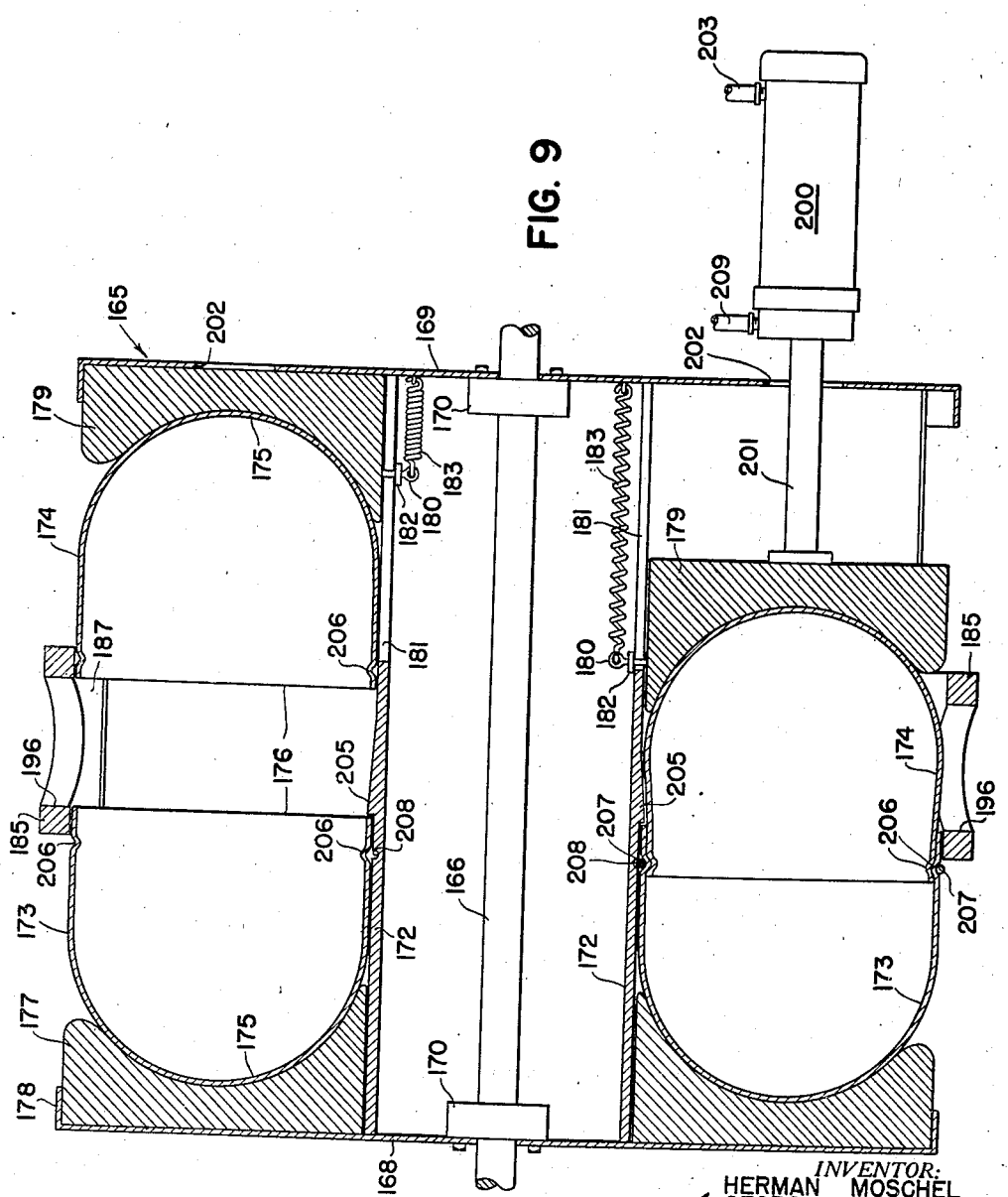

Patented June 26, 1945

2,379,371

UNITED STATES PATENT OFFICE 2,379,371

HARVESTING AND PACKAGING MACHINE

Herman Moschel and George B. Hill, Ottumwa, Iowa, assignors to Dain Manufacturing Company of Ottumwa, Iowa, a corporation of Iowa Application November 20, 1940, Serial No. 366,352

23 Claims. (Cl. 56—1)

The present invention relates generally to harvesting machines and has for its principal object the provision of a field harvester that gathers crops and seals the latter in closed containers which are then discharged from the machine and can be gathered from the field by means of a wagon or truck.

It is now a well-known fact that green grass and alfalfa have a great deal more nutritive value for cattle feed than cured hay, and that a substantial percentage of the nutritive value is rapidly lost during the first few hours after the crop is cut. It therefore follows that green hay should be stored in the silo with as little lost time as possible after it is cut, and several forms of harvesting machines which harvest and chop the green hay and load the same into wagons or trucks have already been devised. This equipment, however, takes care of only the green hay which is to be fed locally, but as far as applicants are aware, no provision has yet been made for quickly and easily packaging the green hay for shipment to remote destinations for feed.

This problem cannot be solved by the use of conventional hay balers, for the bales of green hay would either dry out and lose the greater part of the nutritive value of the hay, or would spoil altogether before they reach their destination. Applicants, therefore, contemplate packing the green crop into suitable drums or containers immediately after it is cut, and which containers can be tightly closed to prevent air from coming in contact with the crop to conserve the nutritive value of the feed and prevent spoiling. These drums or containers can be shipped to remote destinations and can be stored in any suitable storage facilities without the necessity for specially built silos. It is a further and more specific object of our invention, therefore, to provide a green hay harvesting machine with provisions for handling the containers for the green hay ensilage and adapted to move the latter into a filling position, then into a position in which the containers can be closed or sealed, and finally to a discharge position.

These and other objects and advantages of our invention will be made apparent by a consideration of the following description of two representative embodiments of our invention, in which reference is had to the drawings appended hereto, in which Figure 1 is a plan view of a harvesting implement embodying the principles of our invention;

Figure 2 is a side elevation of the machine shown in Figure 1;

Figure 3 is a plan view of the supporting frame and power transmitting mechanism;

Figure 4 is an elevational view drawn to an enlarged scale, showing the detail of the mechanism for controlling the rotation of the turntable conveyor;

Figure 5 is a sectional elevation taken along a line 5—5 in Figure 3 and showing the mechanism for agitating or compacting the crop in the containers during the filling operation;

Figure 8 is a rear elevation of the implement shown in Figure 6; and

Figure 9 is a sectional view taken along a line 9—9 in Figure 8 and drawn to an enlarged scale.

Figure 1:
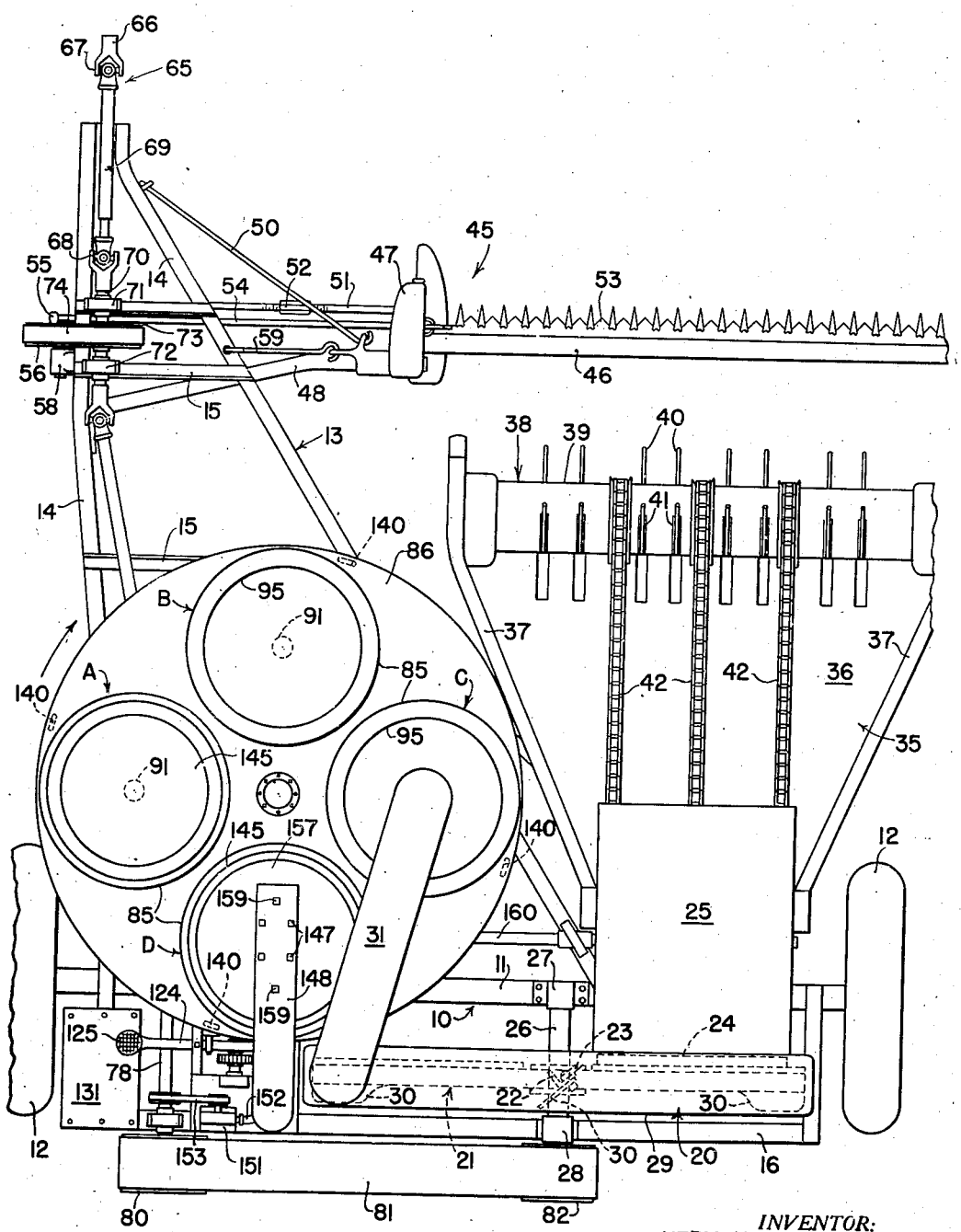
Figure 6:
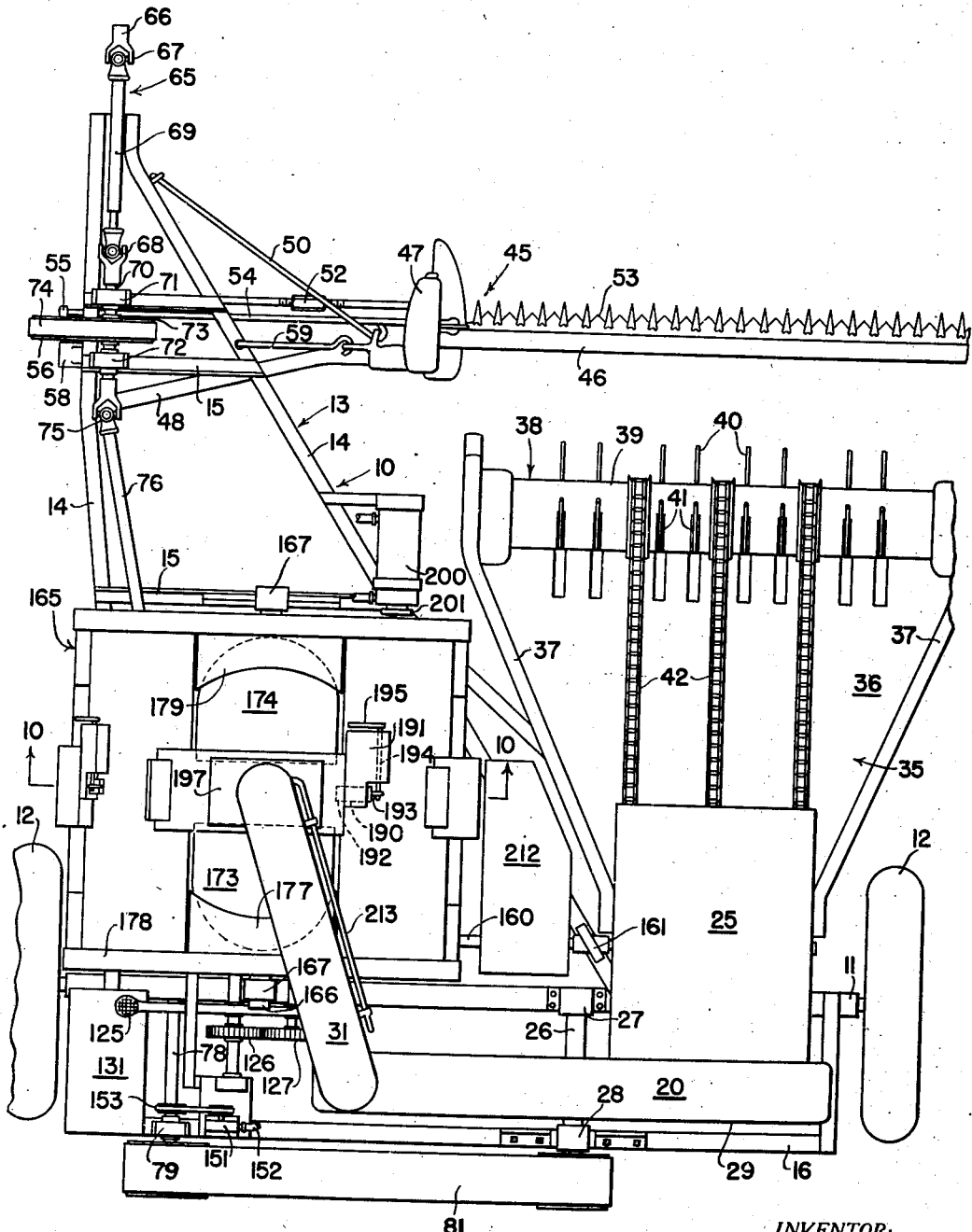
Figure 6 is a plan view of a second embodiment of our invention.

Referring now to the drawings and more particularly to Figures 1-5, inclusive, the supporting frame of the implement, indicated in its entirety by reference numeral 10, comprises a transversely disposed axle member 11 at opposite ends of which are journaled a pair of supporting wheels 12. Extending forwardly from the main supporting axle 11 is a draft frame 13 comprising a pair of forwardly converging draft frame members 14 inclined toward the left or stubbleward side of the implement and braced by means of a plurality of transversely extending bracing members 15 which also serve as supports for various portions of the mechanism. The stubbleward draft member 14 extends rearwardly beyond the axle 11 and is connected to a transverse rear frame member 16 behind the axle member 11. The opposite end of the member 16 is fixed to a rearwardly extending arm 17 which is rigidly attached to the axle member 11 adjacent the grainward supporting wheel 12.

Supported on the transverse members 11, 16 is an ensilage chopper 20 comprising a rotary chopper 21 of the flywheel type having radially extending arms 22 on which are carried the chopping blades 23. The blades 23 cooperate with a suitable stationary cutter bar 24 to chop up the harvested crops, which are fed thereto by means of suitable feeding mechanism (not shown) contained in a feeder housing 25 which is mounted in fixed relation on the supporting frame 10. The rotor 21 is carried on a fore and aft extending shaft 26, which is rotatably journaled in a pair of pedestal bearings 27, 28 which are mounted on the axle member 11 and rear frame member 16, respectively. The rotor 21 is contained within a housing 29, which is fixedly mounted on the supporting frame 10 and communicates with the feeder housing 25 to admit the harvested crops to the cutter bar. The arms 22 are provided with fan blades 30 at the outer ends thereof, which serve to propel the chopped hay through a tangential discharge pipe 31 extending upwardly on one side of the chopper housing 29. The discharge pipe 31 is U-shaped and terminates in a downwardly extending discharge spout 32.

The harvested crops are gathered and conveyed to the feeder housing 25 by means of a forwardly extending platform 35, which is pivotally mounted on the feeder housing 25 by means providing for vertical swinging movement relative thereto. The platform 35 comprises a deck 36 and a pair of forwardly diverging side walls 37 and at the forward edge of the platform is a pickup device 38 of any suitable type, the details of which are not important in connection with the present invention. Preferably, however, the pickup device comprises a drum 39 rotatably mounted transversely across the front edge of the platform 35 and has a plurality of pickup fingers 40 extending through slots 41 in the drum, within which is disposed suitable mechanism for retracting the fingers in a well-known manner when the crop is discharged from the drum to the platform. The drum 39 is driven by a plurality of chains 42, which extend rearwardly along the deck 36 and have suitable projections for engaging the crop and moving it rearwardly into the feeder housing 25.

Ahead of the pickup device 38 is disposed a mower 45 mounted on the draft frame 13 and comprising a cutter bar 46 pivotally mounted on a shoe arch 47 for vertical swinging movement about a fore and aft extending axis. The shoe arch 47 is carried on the end of a drag bar 48 which extends under the draft frame 13 and is pivotally connected at the far side of the latter by a bracket 49 providing for vertical swinging movement in a transversely extending plane. A link 50 connects the outer end of the drag bar 48 with the forward end of the draft frame 13. A tie rod 51 is also pivoted to the shoe arch 47 and extends transversely to a pivotal connection with the draft frame 13 substantially in fore and aft alignment with the pivotal connection of the drag bar 48. A turnbuckle 52 in the tie rod 51 provides for adjustment to prevent the cutter bar from dragging rearwardly. A sickle 53 cooperates with the cutter bar 46 and is reciprocated by means of a pitman 54, which is connected to a crank 55 on a flywheel 56 mounted on a shaft 57 which is journaled in a pedestal bearing 58 rigidly supported on the draft member 14. A supporting link 59, connected between the outer end of the drag arm 48 and the grainward draft frame member 14, limits the extent of downward swinging movement of the drag bar 48. If desired, the mower 45 can be removed and the machine used to pick up crops which have been previously windrowed.

Power to operate the mower and the other mechanism on the implement is obtained from the power take-off shaft of the tractor which draws the implement, by means of a power shaft 65 comprising a splined sleeve member 66 adapted to be attached to the tractor power take-off shaft, and is connected through a pair of universal joints 67, 68 and a telescoping shaft section 69 to a shaft 70 journaled in a pair of bearings 71, 72 on the draft frame 13. A pulley 73 is fixed to the shaft 70 and drives the flywheel 56 by means of a belt 74. The shaft 70 is connected through a universal joint 75 to a shaft section 76 which in turn is connected through a universal joint 77 to a power shaft section 78 from which power is taken to operate various parts of the mechanism, as will be described later. The power shaft section 78 is supported in aligned bearings 79 carried on the supporting frame 10. The shaft 78 extends rearwardly from the rear bearing 79 to support a pulley 80, which is connected by means of a power transmitting belt 81 to a pulley 82 mounted on the overhanging rear end of the rotor shaft 26.

In operation, the implement is drawn forwardly, whereupon the mower 45 severs the grass or alfalfa, dropping it to the ground behind the cutter bar, and the pickup device 38 picks the crop off the ground and the chains 42 convey the same rearwardly into the feeder house 25 within which is provided suitable mechanism for feeding the crop into the chopper over the cutter bar 24. The blades 30 of the chopper create a forced draft which blows the crops through the U-shaped pipe 31 and out of the discharge spout 32 into suitable drums or containers 85. The latter are supported on a rotary conveyor, which is in the form of a turntable 86. The turntable 86 is provided with a supporting spider 87 carried on a central spindle 88, which is journaled in a central pivot bearing block 89 fixed to a pair of transverse members 15 of the supporting frame 10. Each of the containers 85 rests upon a plate 90, which lies on top of the turntable 86 and is fixed to a downwardly extending stem 91 which is slidable within a vertically extending aperture 92 in the turntable 86. Preferably, the turntable carries four drum supporting plates 90 which define four positions for the drums or containers, indicated in Figure 1 as positions A, B, C and D. In position A the filled drum is removed from the platform and an empty drum is set there to take its place. The turntable is rotated in a clockwise direction, as viewed in Figure 1, and thus the drums rotate progressively from position A to positions B, C and D, respectively. In position C the empty drum is located directly under the downwardly turned discharge spout 32 of the pipe 31. Each of the drums 85 is cylindrical in form and is preferably constructed of imperforate sheet metal and has a solid bottom when set on one end, as illustrated, the top of each drum being open except for a narrow inwardly extending flange 95.

While each of the containers 85 is being filled with chopped ensilage, it is vigorously jarred to compact the material in the container in order to settle the material and eliminate air spaces. This is done by means of a rotary camming member 100 fixed to a fore and aft extending shaft 101, which is journaled in suitable bearings 102, which are mounted on two of the cross members 15 and extends rearwardly to a rear supporting bearing 103 mounted on the axle 11. The shaft 101 is driven through a pulley 104 fixed on the rear end of the shaft and which receives power through a belt 105, which is driven by means which will be described later. The cam member 100 is disposed in a position to engage the lower ends of each of the spindles 91 when the respective drum supporting plate 90 is in said filling position C, and the surface of the camming member 100 is spiral in form when viewed in an axial direction, as in Figure 5, terminating in a radially disposed plane 106, with the result that when the member 100 is rotated, it forces the spindle and its respective plate 90 upwardly, thus raising the container which is being filled, and then releases the spindle, allowing the plate 90 and container 85 to drop abruptly against the turntable 86, whereupon the jar occasioned by the drop tends to compact and settle the material in the container. The camming member 100 may be rotated at any desired speed and the camming surface can be formed with any desired amount of pitch so that the frequency and amplitude of the jarring action is optional. The camming surface of the member 100 is also rounded or beveled, as indicated in Figure 3, in order to prevent the cam from obstructing the movement of the turntable as the latter swings the spindle 91 into engagement with the cam, as will be readily understood.

Power is obtained for driving the camming member 100 from a jackshaft 110, which is disposed parallel to the power shaft 78 and is journaled in a plurality of bearing blocks 111 fixed to the supporting frame 10. The jackshaft 110 is provided with a drive pulley 112 which is fixed thereto and driven by a belt 113 trained over a driving pulley 114 fixed to the power shaft 78. The belt 105 which drives the camming member 100 is trained over a pulley 115, which is mounted fixedly on the jackshaft 110.

The turntable 86 is rotated by power obtained from the jackshaft 110, as will now be described.

Journaled on the jackshaft 110 are a pair of fore and aft spaced arms 120 rigidly interconnected by a cross brace 121. Adjacent the outer ends of the arms 120 is journaled a shaft 122 upon which is fixed a friction drive wheel 123. One of the supporting arms 120 has a rearward extension 124 beyond the jackshaft 120, the rear end of which is provided with a foot pedal 125. As best illustrated in Figure 4, the drive wheel 123 can be forced into contact with the underside of the turntable 86 by pressure applied to the foot pedal 125. The drive wheel 123 is driven by power transmitted through the shaft 110 by means of a pair of intermeshing gears 126, 127, which are fixed to the jackshaft 110 and to the extended end of the wheel supporting shaft 122, respectively. Thus, it is evident that the drive wheel 123 is rotated continuously from the jackshaft 110, while the turntable 86 can be optionally rotated by forcing the drive wheel 123 against the under surface of the turntable, to which power is transmitted by frictional contact of the drive wheel 123 upon the turntable. When pressure is relieved from the foot pedal 125, the drive wheel 123 is swung away from the platform by means of a tension spring 128 connected to the lever arm 124 and anchored by means of a bolt 129 to a stationary frame member 130. A platform 131 is provided for carrying the operator who controls the rotation of the turntable.

The turntable is locked in each of the four positions A, B, C and D by means of a latching rod 135, which is slidable vertically in an apertured supporting block 136 which is rigidly fixed to the frame member 130. The lower end of the latch rod 135 is pivotally connected by means of a bolt 137 to the lever arm 124, and at the upper end of the rod 135 is journaled a roller 138, which is adapted to engage a plurality of notches 140, one provided at each of the positions A, B, C, D, respectively. When pressure is applied to the foot pedal 125, the latch 135 is drawn downwardly out of the notch 140, whereupon the roller 138 bears against the under side of the turntable 86 and holds the friction wheel 123 in contact with the turntable and thus permitting the operator to remove his foot from the pedal 125 without interrupting the movement of the turntable. When the turntable has swung through an angle of 90 degrees, the roller 138 is forced into the corresponding notch 140 by action of the spring 128 and locks the turntable against further rotation and at the same time permits the friction wheel 123 to swing away from the platform and thus interrupt the transmission of power thereto. The pivot bolt 137 can be inserted through a second aperture 141 in the latch rod 135 in case the operator prefers to maintain control over the rotation of the turntable at all times so that he may stop the latter at any time by releasing his foot from the pedal 125. In this case the roller 138 does not engage the turntable during rotation of the latter, but is engageable with one of the notches 140 to hold the turntable in each of the normal operating positions.

The drums 85 are sealed after they are filled and moved to position D, by pressing a tight fitting cover 145 into the opening 95 at the upper end of the drum 85. This is preferably accomplished by means of a hydraulic mechanism including a hydraulic cylinder 146 rigidly attached by bolts 147 to a supporting arm 148 which is mounted on a sleeve 149 which fits over the upper end of a post 150, which stands rigidly on the rear end of the supporting frame 10. The cylinder 146 is supplied with oil under pressure by means of a small oil pump 151 mounted on the implement frame 10 and connected to the cylinder 146 by means of a flexible hose 152 which is supported on the post 150. The pump 151 is driven by power transmitted from the main power shaft 78, by means of a belt 153.

The piston rod 155 extends downwardly out of the cylinder 146 and is provided with a supporting flange 156 which is bolted to a circular plate 157, which is adapted to fit into a depression or recess in the drum cover 145. The hydraulic pump 151 is provided with suitable control means for optionally applying pressure to the cylinder 146 and for releasing the same. Inasmuch as the present invention is not concerned with the details of the hydraulic mechanism, they are omitted from this description for the sake of simplicity, but it is to be understood that any suitable mechanism can be used for pressing the covers into the drums. In the present embodiment, when the pressure is released from the cylinder 146, the piston and the circular plate 157 attached thereto are raised by means of coil springs 158, which are connected by bolts 159 to the supporting arm 148.

The pickup device 38 is driven through the chains 42 which are in turn driven from a transversely extending power shaft 160 journaled in a pair of laterally spaced bearings 161 on the supporting frame 10. Power is transmitted to the shaft 160 from the jackshaft 110 by means of a pair of intermeshing beveled gears 162, 163.

During operation the implement is connected at its forward end to the drawbar of the tractor by suitable means well-known to those skilled in the art, and the power shaft is connected to the power take-off shaft of the tractor by means of the splined sleeve 66. As the implement advances, the mower 45 cuts the green grass or alfalfa and drops the same upon the ground from which it is picked up by the pickup device 38 and conveyed by means of the chains 42 rearwardly to the feeder house 25 from which it is fed to the rotary blades 23 of the chopper 20. After the harvested crop is chopped, it is forced through the feed pipe 31 by the centrifugal action of the fan blades 30 and by the draft of air thrown up by the latter and the material is thus blown into the container or drum 85, which is disposed in position C on the turntable. The empty containers are supplied from a truck or wagon and are placed on the turntable at position A. An operator is stationed on the platform 131 and controls the rotation of the turntable 86 by means of the foot pedal 125, as heretofore described. As each of the drums is filled in position C, the operator revolves the turntable one-quarter of a revolution, bringing the filled container into position D and places thereupon a cover which he presses into the opening by means of the hydraulic mechanism described above, and at the next quarter revolution of the turntable, he pushes the filled and sealed container off the turntable from position A to the ground, thus leaving space for an empty drum to be supplied from the wagon.

Referring now to Figures 6–9, inclusive, the second embodiment of the present invention employs the same harvesting and chopping mechanism described in connection with the first embodiment, and therefore the foregoing description of such mechanism may be referred to, the corresponding parts being indicated by the same reference numerals. In the latest embodiment of our invention, however, the containers into which the chopped harvested material is stored, instead of being cylindrical drums, are in the general shape of egg shells divided into two parts along a plane passing generally through the minor axis of the shell. The two halves of the container are adapted to fit together with their edges in telescoping arrangement and are crimped to interlock in such a manner that they be firmly secured together by means of baling wire, as will be described later.

Figures 7, 10:
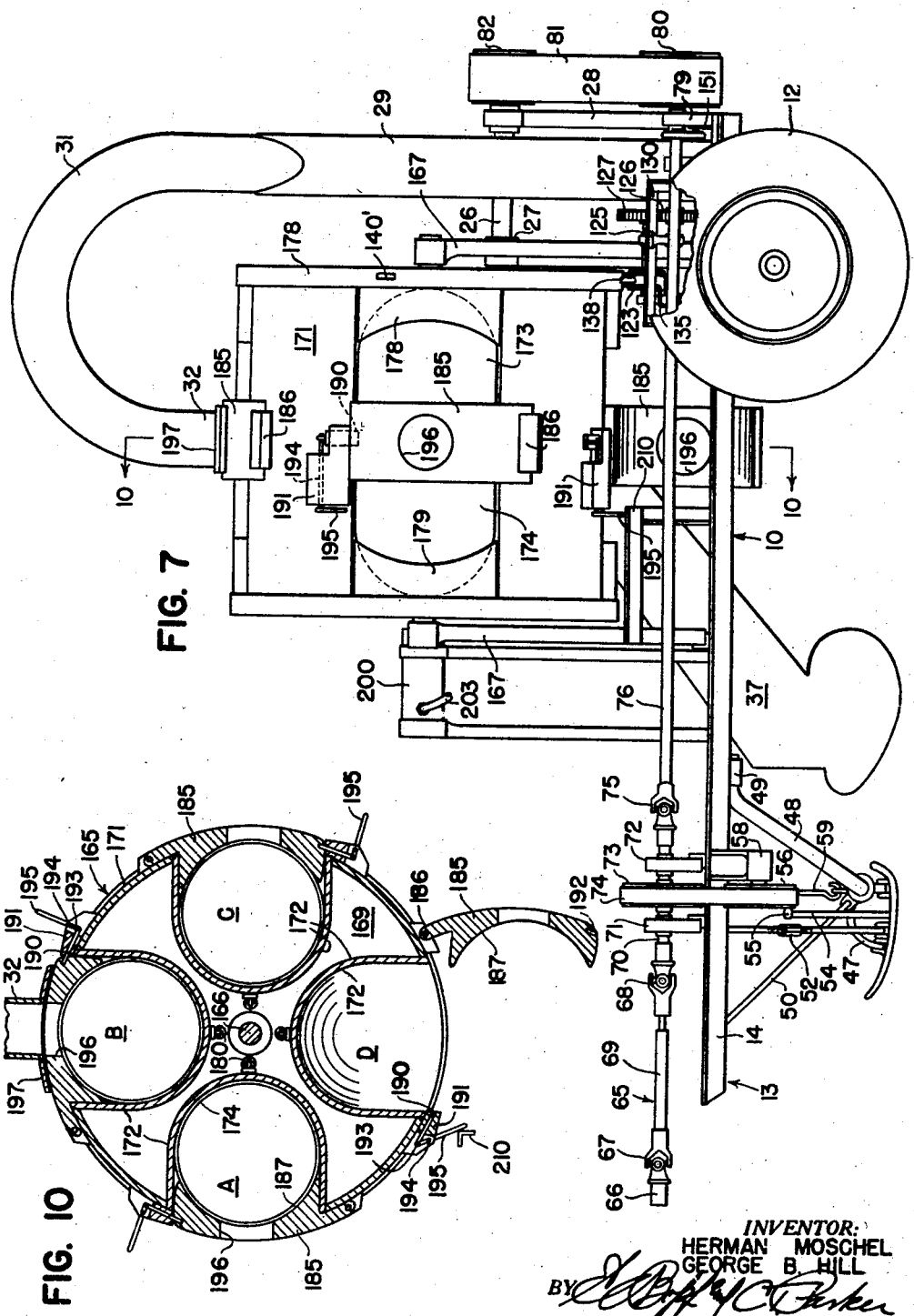
Figure 7 is a side elevation of the implement shown in Figure 6.
Figure 10 is an enlarged sectional view taken along a line 10—10 in Figure 7.

The conveyor for the conveyor shells of this embodiment is in the form of a generally cylindrical rack 165 supported on the frame 10 by means providing for rotation about a substantially horizontal fore and aft extending axis. The conveyor rack 165 is supported on a centrally disposed shaft 166 which is journaled at opposite ends, respectively, in a pair of pedestal bearings 167 which are supported on cross frame members 15 and on the axle member 11, respectively. The rack 165 comprises a pair of circular end plates 168, 169 which are attached to a pair of hubs 170 fixedly mounted on the shaft 166, and supported between the end plates is a cylindrical body 171, into which four pockets or recesses 172 are sunk. Each of the pockets 172 comprises a U-shaped trough opening outwardly and supported fixedly at opposite ends thereof on the two end plates 168, 169, respectively. Each of these pockets 172 serves as a receptacle for a container which comprises a pair of complementary metal shells 173, 174, having rounded end portions 175 and telescoping edges 176, as best illustrated in Figure 9. Each of the pockets 172 is provided with a relatively fixed socket member 177 having a concave surface adapted to receive the rounded end portion 175 of one of the container halves 173 and is fixedly held in place by means of a flange 178 turned inwardly from the end plate 168. The other container half 174 is received within a socket member 179 which is slidable axially within the pocket 172 but is retained therein by means of a bolt 180, which is fixed to the socket member 179 and extends through a slot 181 in the bottom of the pocket 172. A washer 182 engages the bolt 180 outside of the slot 181 and thus prevents the socket member 179 from falling out of the recess or pocket 172. The socket member 179 is held in retracted position by means of a spring 183 which is connected between the bolt 180 and the end plate 169. Each half 173, 174 of the container normally seats in one of the socket members 177, 179, respectively, the latter being normally disposed in retracted position, as indicated in Figure 9. In this position the two edges 176 of the container members 173, 174 are spaced apart in an axial direction for the purpose of receiving chopped harvested material into the container. The container members are placed in this position in the pocket 172 when the latter is in position A, as indicated in Figure 10, in which position the pocket 172 is easily accessible from the stubble-ward side of the machine. The container is secured in the pocket by means of a yoke member 185 which is swingably connected to the outer surface of the cylindrical rack 171 by means of a hinge member 186. The yoke 185 is swingable across the recess 172 and has an inner concave surface 187 which is adapted to embrace the edges 176 of the container members 173, 174 and thus to close the opening between the two container members. The yoke 185 can be locked in closed position by means of a slidable latch bar 190 which is slidably supported in a block 191 on the cylindrical portion 171 of the rack adjacent the opposite side of the pocket from the hinge member 186. The latch bar 190 is slidable into a slot or recess 192 in the end of the yoke member 185. The latch bar 190 is actuated by means of an arm 193 connected thereto and fixed to a rock shaft 194 mounted for rocking movement in the block 191 and at the opposite end of the rock shaft is a control lever 195.

After the container shells 173, 174 have been properly locked into pocket 172 when the latter is in position A, the cylindrical rack 165 is then rotated through an angle of 90 degrees to bring the container up into the filling position, as indicated at B. In this position the lower end of the discharge spout 32 is disposed in register with an opening 196 in the yoke 185 and in this position the harvested material is free to flow through the spout 32 into the opening 196. Leakage of the material around the edges of the spout 32 is minimized by means of a flange 197 fixed to the lower end of the spout closely adjacent the outer surface of the yoke 185.

As soon as the container is filled the conveyor rack 165 is rotated another 90 degrees into position C, in which it is to be closed and sealed. The container shells 173, 174 are telescoped together by means of a hydraulic cylinder 200 in which is disposed a suitable piston attached to a piston rod 201, which is adapted to slide through a suitable aperture 202 in the end plate 169 and bear against the end of the socket member 179. The cylinder 200 has a suitable hose connection 203 for the supply of fluid to actuate the piston, which forces the piston rod 201 against the socket member 179 and pushes the container shell 174 into telescoping engagement with the other container shell 173. The entry of the edge 176 of the movable shell member 174 into the shell member 173 is facilitated by means of suitable ramp portions 205 disposed on the inner surface of the pocket 172. The container shells 173, 174 are provided with interlocking crimps or grooves 206 to provide for securing the two halves of the container together, after which they can be even more securely bound by means of a baling wire 207, which is tightly bound around the container in the outer groove 206. Each of the pockets 172 is provided with a slot or groove 208 to permit the wire to be threaded therethrough around the circumference of the container.

After the container has been secured by the baling wire 207, the piston rod 201 is retracted by supplying oil under pressure to the opposite side of the piston through a pipe connection 209. As the piston rod 201 is retracted the spring 183 draws the socket member 179 back to its normal position against the end plate 169, leaving the container supported on the yoke 185. The conveyor rack 165 is then rotated another quarter of a revolution, bringing the filled container to position D at the lower side of the cylinder. At this point the trip lever 195, which controls the latch bar 190, engages a stop member 210 which is rigidly supported on the frame 10. This retracts the latch bar 190 from the slot 192 in the yoke 185, permitting the latter to swing downwardly, as indicated in Figure 10, and thus releasing the closed container, allowing the same to drop to the ground under the implement.

The cylindrical rack 165 is rotated by means of a friction wheel drive similar to that described in connection with Figures 1–5, and is controlled by a foot pedal 125 under control of an operator stationed on the platform 131. In this embodiment the friction wheel 123 and the roller 133 engage the flange 178 around the circumference of the end plate 168, and the roller 138 on the latch 135 engages suitably spaced notches 140', recessed into the flange 178 and socket members 177.

Although this embodiment has the disadvantage that it requires an additional operator stationed on the platform 212 for applying the baling wires, it has the advantage that the containers are somewhat easier to handle, especially the empty containers, which can all be nested together in a compact arrangement.

It will be evident to those skilled in the art that this invention provides for packaging and sealing the chopped grass or other crop in a very short time after mowing, and thus retaining all the nutritive value of the crop. Molasses can be added to the grass by means of a feed pipe 213, which is connected to discharge into the spout 32, in accordance with common practice.

We claim:

1. In a crop packaging machine, the combination of mobile frame, rotary chopping means disposed on said frame for reducing crops fed thereto to receive said crops from said gathering mechanism and including crop throwing means for imparting velocity to the chopped crops, a movable conveyor mounted on said frame and adapted to receive containers and move the latter progressively to filling position and to discharge position, and spout means connected to the discharge from said rotary chopping means for conducting the crops thrown from said chopping means for filling said containers.

2. In a crop packaging machine, the combination of a mobile frame, rotary crop reducing means on said frame, said reducing means including crop throwing impellers for imparting velocity to the chopped crops, supporting means for containers on said frame, conduit means connected to the discharge from said rotary reducing means, feeding means at the end of said conduit means for filling said containers with crops from said crop reducing means, and mechanism for compacting said crops in said container during the filling operation.

3. In a crop packaging machine, the combination of mobile frame adapted to be propelled in the field, rotary chopping means for reducing said crops disposed on said frame to receive said crops and including crop throwing means for imparting velocity to the chopped crops, a rotatable container support journaled on said frame and adapted to receive containers and move the latter progressively to filling position, sealing position, and discharge position, spout means connected to the discharge from said rotary chopping means for conducting said crops thrown from said chopping mechanism and feeding the same into said containers at said filling position, and mechanism for compacting said crops in said containers.

4. In a crop packaging machine, the combination of a mobile frame, a turntable mounted on said frame adapted to receive and move containers successively to filling and discharge positions, and feeding means for feeding the same into said containers, said feeding means comprising a blower and a U-shaped delivery conduit extending upwardly from said blower and discharging downwardly into said containers.

5. In a crop packaging machine, the combination of mobile frame, a turntable mounted on said frame adapted to receive and move containers successively to filling and discharge positions, a blower for receiving said crops, a delivery conduit extending upwardly from said blower and discharging into said containers, and means for agitating each container during filling.

6. In a crop packaging machine, the combination of a mobile frame, crop handling mechanism for receiving crops from pickup mechanism and discharging the same into containers, a conveyor for moving said containers successively into filling position and discharge position, a power shaft journaled on said frame and connected to a suitable source of power, means connecting said crop handling mechanism with said power shaft to receive power therefrom, means including a disengageable clutch device for transmitting power from said power shaft to drive said conveyor intermittently to advance said containers, said clutch device comprising a drive wheel, a support therefor, said support being movable to move said wheel into and out of engagement with said conveyor, a disengageable locking member engaging said conveyor for locking the latter against movement relative to said frame, and means connecting said locking member with said drive wheel support for disengaging said member when said drive wheel is moved into driving relation with said conveyor.

7. A crop packaging machine comprising a supporting frame, a pair of transversely spaced wheels journaled thereon, a draft member extending forwardly at one side of said frame, a crop gathering platform pivotally mounted at the opposite side of said frame, a chopper for reducing crops received from said gathering platform, a container support rotatably mounted on said frame above said draft member, means for conveying reduced crop material from said chopper and discharging the same into containers on said support, and means for rotating the latter to move a filled container to a discharge position and an empty container into filling position.

8. A crop packaging machine comprising a supporting frame, a pair of transversely spaced wheels journaled thereon, a draft member extending forwardly at one side of said frame, a crop gathering platform pivotally mounted at the opposite side of said frame, a chopper for reducing crops received from said gathering platform, a turntable rotatably mounted on said frame above said draft member for movement about a vertical axis, means for conveying reduced crop material from said chopper and discharging the same into containers on said support, and power operated means under control of the operator, for optionally revolving said turntable to move a filled container to a discharge position and an empty container into filling position.

9. A crop packaging machine comprising a supporting frame, a pair of transversely spaced wheels journaled thereon, a draft member extending forwardly at one side of said frame, a crop gathering platform pivotally mounted at the opposite side of said frame, a chopper for reducing crops received from said gathering platform, a rotary container support mounted on said frame above said draft member for rotation about a generally horizontal axis, means for conveying reduced crop material from said chopper and discharging the same into containers on said support, and means for rotating the latter to move a filled container to a discharge position and an empty container into filling position.

10. In a crop packaging machine comprising a mobile frame, a crop reducing mechanism for receiving crops and discharging the same into containers, said mechanism comprising a flywheel type cutter having crop impeller blades for imparting velocity to the chopped crops, a rotatable container conveyor journaled on said frame for moving said containers to said reducing mechanism to be filled, spout means connected with the discharge from said cutter and disposed in register with said containers in their filling position, and power driven means mounted on said frame, for pressing covers onto said containers after being filled.

11. In a machine of the class described, having a supporting frame, a container conveyor comprising a generally cylindrical rotary frame journaled on said supporting frame for rotation about a substantially horizontal axis, recessed supporting sections spaced apart generally horizontally in said rotary frame for receiving containers, each comprising a pair of complementary metal shells adapted to fit snugly together, said supporting sections being collapsible to force said shells together horizontally into fitting engagement, power operated means for collapsing said sections to close said containers after being filled, individual means for locking each of said containers in said rotary frame, an individual trip lever associated with each of said locking means engageable with stop means on said supporting frame for releasing said locking means when the container moves to discharge position, to discharge the same.

12. In a crop packaging machine comprising a mobile frame and a rotary chopping mechanism, the combination of a rotary conveyor for containers comprising a frame journaled on said mobile frame for rotation about a generally horizontal axis, means for conveying crops from said chopping mechanism and discharging them into containers on said conveyor, each of said containers comprising a pair of complementary shells adapted to fit snugly together, recessed supporting sections in said rotary conveyor frame for receiving the ends of said containers, said supporting sections being movable relatively toward each other to force said shells together and away from each other to open a space therebetween through which said containers can fall, power operated means for moving at least one of said sections to close said containers after being filled, and latch means, releasable responsive to movement of said conveyor, for holding said containers until they reach a discharge position.

13. In combination, a conveyor comprising a frame and at least one pair of hemispherically recessed supports adapted to receive a pair of complementary hemispherical container shells, respectively, said supports being mounted on said frame by means providing for movement toward and away from each other, individual means for retaining said containers in said supports including individual trip levers for releasing the retaining means selectively, means for introducing filling material into said containers, successively, power operated means for forcing said supports together to close said containers, and a single stop adapted to engage each of said trip levers as the supports move into discharge position.

14. A crop packaging machine comprising a mobile frame, rotary chopping mechanism for reducing and imparting velocity to the gathered crops, means for supporting containers in a position to be filled with said crops, means for feeding the latter thrown from said chopping mechanism into said containers, mechanism for closing said containers, and a control member under control of an operator for controlling the actuation of said closing mechanism.

15. A crop packaging machine comprising a mobile frame, rotary chopping mechanism on said frame for reducing gathered crops and adapted to discharge the reduced crops at relatively high velocity, means for supporting containers in a position to be filled with said crops, means for feeding the reduced crops into said containers, mechanism for agitating said containers while they are being filled, a power shaft for driving said mechanism, mechanism connected to receive power from said shaft for closing said containers, and a control member under control of an operator for controlling the actuation of said closing means.

16. For use in a crop packaging machine the combination of a frame, a flywheel type rotary chopper disposed on said frame to receive crops and including propelling blades on the rotary chopper for imparting velocity to the chopped crops and serving as fan blades to create a blast of air to aid in moving the crops, a rotatable container support journaled on the frame and adapted to receive containers and move the latter progressively to filling position, sealing position, and discharge position, a U-shaped delivery conduit connected with the discharge from said rotary chopper, extending upwardly therefrom and discharging downwardly, and spout means at the end of said duct disposed in register with said containers in their filling position, for feeding the chopped crops into the same.

17. A crop packaging machine comprising a supporting frame, a pair of transversely spaced wheels journaled thereon, a draft member extending forwardly at one side of said frame, a crop gathering device extending forwardly at the opposite side of said frame for gathering crops from the field and moving them rearwardly on said frame, a rotary chopper of the flywheel type disposed in a generally vertical plane across the rear of said frame for rotation about a generally fore and aft extending axis, said chopper including crop impellers for imparting velocity to the chopped crops, a rotary container support mounted on said frame above said draft member, conduit and spout means for conducting chopped crop material discharged from said chopper into containers on said support, and means for rotating the latter to move a filled container to a discharge position and an empty container into filling position.

18. In a machine of the class described, a conveyor for receiving containers comprising a pair of complementary shell members, said conveyor comprising a frame journaled for rotation about a generally horizontal axis and having recesses opening radially outwardly to receive and discharge said containers, means engaging opposite ends of said containers for retaining the same in said recesses, at least one of said retaining means being slidable axially in its associated recess, and means for moving said retaining means relatively toward each other to close said containers and relatively apart to drop said containers radially out of said recesses as said frame rotates the latter to an underneath position.

19. In a machine of the class described, a conveyor for receiving containers comprising a pair of complementary shell members, said conveyor comprising a frame journaled for rotation about a generally horizontal axis and having recesses opening radially outwardly to receive and discharge said containers, means engaging opposite ends of said containers for retaining the same in said recesses, one of said retaining means in each of said recesses being slidable axially thereof, a hydraulic cylinder member engageable with each of said retaining members for sliding the latter axially to close the containers, and spring means for returning said slidable members to permit the containers to drop radially out of said recesses as said frame rotates.

20. In a machine of the class described, a conveyor for receiving containers comprising a pair of complementary shell members, said conveyor comprising a frame journaled for rotation about a generally horizontal axis and having recesses opening radially outwardly to receive and discharge said containers, each of said recesses being sufficiently long to receive a pair of shell members spaced apart to receive filling material, gate means on said frame extending over said recesses and engaging said shell members to retain them within said recesses, said gate means having openings for receiving material therethrough to fill said containers, and means responsive to movement of said frame to a predetermined position for disabling the gate means over a certain recess to release the container therein.

21. In a machine of the class described, a conveyor for receiving containers comprising a pair of complementary shell members, said conveyor comprising a frame journaled for rotation about a generally horizontal axis and having recesses opening radially outwardly to receive and discharge said containers, each of said recesses being sufficiently long to receive a pair of shell members spaced apart to receive filling material therebetween, a gate mounted on said frame by means providing for movement from an open position permitting a container to be inserted into or removed from said recess, to a closed position engaging the adjacent edges of said pair of shells and having an aperture therein to provide for feeding material into said container, latch means for releasably locking said gate in position, and means for forcing said shell members together to retain said material therein.

22. In a machine of the class described, a conveyor for receiving containers comprising a pair of complementary shell members, said conveyor comprising a frame journaled for rotation about a generally horizontal axis and having recesses opening radially outwardly to receive and discharge said containers, means engaging opposite ends of said containers for retaining the same in said recesses, at least one of said retaining means being slidable axially in its associated recess, means for moving said retaining means relatively toward each other to close said containers, each of said recesses being sufficiently long to receive a pair of shell members spaced apart to receive filling material therebetween, a gate mounted on said frame by means providing for movement from an open position permitting a container to be inserted into or removed from said recess, to a closed position engaging the adjacent edges of said pair of shells and having an aperture therein to provide for feeding material into said container, latch means for releasably locking said gate in position, and means for forcing said slidable retaining means relatively toward each other to close said container.

23. In a machine of the class described, a conveyor for receiving containers comprising a pair of complementary shell members, said conveyor comprising a frame journaled for rotation about a generally horizontal axis and having recesses opening radially outwardly to receive and discharge said containers, means engaging opposite ends of said containers for retaining the same in said recesses, one of said retaining means in each of said recesses being slidable axially thereof, a push rod supported at one end of said frame in axial alignment with each of said containers in one position of the latter as said frame rotates, said push rod being slidable axially into engagement with the adjacent retaining means, and means for exerting a force against said push rod for pressing said shell members together in closed position after the latter are filled.

HERMAN MOSCHEL.
GEORGE B. HILL.